Oct. 19, 1965 H. D. COGHILL 3,213,317

RADIATION SENSITIVE ELECTROLUMINESCENT DEVICES

Filed July 30, 1962

Inventor:
Henry D. Coghill
by Joseph V. Claeys
His Attorney.

United States Patent Office 3,213,317

Patented Oct. 19, 1965

3,213,317

RADIATION SENSITIVE ELECTROLUMINESCENT DEVICES

Henry D. Coghill, Burnt Hills, N.Y., assignor to General Electric Company, a corporation of New York Filed July 30, 1962, Ser. No. 213,455
7 Claims. (Cl. 315—59)

Figure 1:
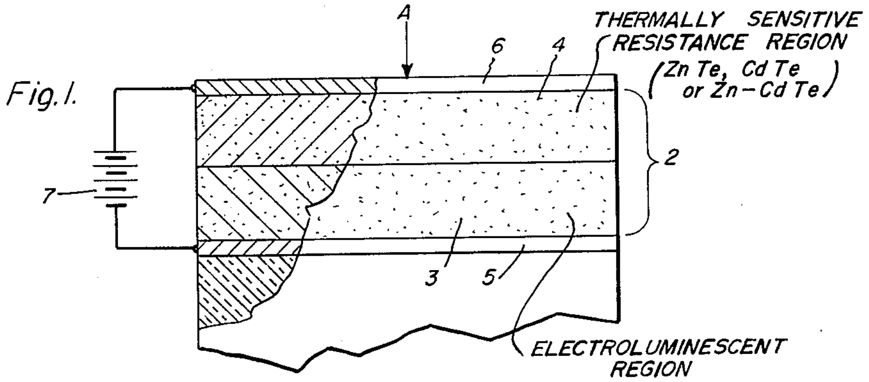

This invention relates generally to solid-state electroluminescent devices. Although this invention has a wide range of applications it is particularly suited for visual display radiation detector devices and will be particularly described in that connection.

It is known in the prior art to provide solid-state visual display radiation detector devices employing photoconductor and electroluminescent devices in appropriate combination. In such devices or systems the incident radiant energy excites the photoconductor lowering its resistance thereby increasing the field across the associated electroluminescent device and producing a visible output therefrom. Such devices are often slow to respond, may be insensitive and, since the photoconductor is excited by only a very narrow band of radiation, require matching the photoconductor response to the incident radiation to be detected. Such devices, therefore, are not entirely satisfactory particularly for the detection of wide band radiation sources.

It is an object of this invention to provide new and improved solid-state electroluminescent devices.

It is a further object of this invention to provide new and improved solid-state radiation detector devices which substantially overcome one or more of the foregoing prior art difficulties.

Briefly stated, in accordance with one aspect of this invention, a new and improved electroluminescent device comprises a first region of an electroluminescent material and a second region of a thermally sensitive resistance material in electrically conducting relationship. First and second transparent electrodes are provided in contact with the surface of the electroluminescent and thermally sensitive resistance material respectively.

In accordance with another aspect of this invention an improved electroluminescent device comprises a composite structure including, in order, a region of an electroluminescent material, a region of an electrically conducing material and a region of a thermally sensitive resistance material all disposed in electrically conducting relationship and sandwiched between a pair of transparent electrodes.

As used herein and in the appended claims the term "thermally sensitive resistance material" relates to a material whose resistance changes appreciably, usually more than one percent per degree centigrade, with temperature, such as materials known in the art as thermistors, and wherein the temperature coefficient of resistance may be either positive or negative. Further, the term "transparent" with respect to the electrodes is intended to include transparency to both visible and invisible radiation.

Figure 2:
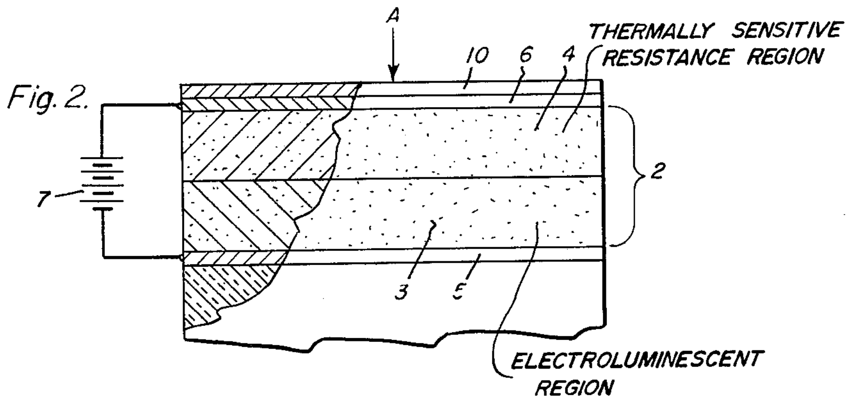
Figure 3:
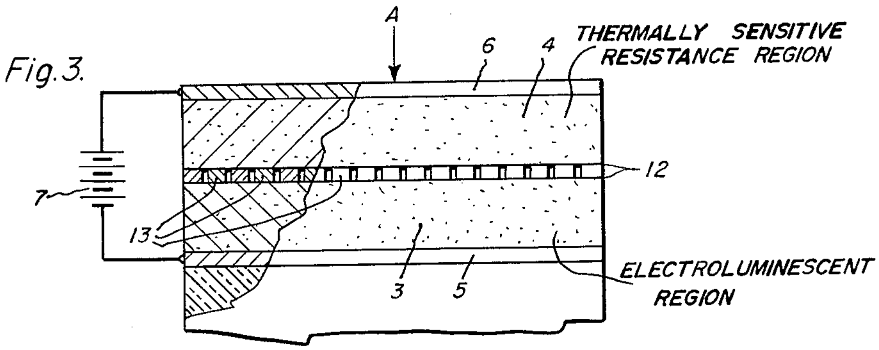

The novel features believed characteristic of this invention are set forth with particularity in the appended claims. My invention itself, however, both as to its organization and method of operation, together with further advantages thereof, will best be understood by reference to the following description taken in conjunction with the accompanying drawing in which:

FIGURE 1 is a schematic vertical sectional view of one embodiment of this invention, and FIGURES 2 and 3 are similar views of other embodiments of this invention.

In FIGURE 1 there is shown a device, generally designated at 1 having the structure and features of this invention. Device 1 comprises a composite structure 2, having a region 3 of an electroluminescent material and a region 4 of a thermally sensitive resistance material in contacting relationship, sandwiched between two transparent electrodes 5 and 6.

Region 3 may be of any conventional electroluminescent material known in the art such as a suitably activated and coactivated phosphor of the zinc-cadmium sulfo-selenide family. Another typical suitable material for the electroluminescent region 3 may be, for example, a copper activated zinc oxide-zinc sulfide mixture, an electroluminescent material also well-known in the art.

Region 4 may be of any of the well-known thermally sensitive resistance materials, preferably one having a negative temperature coefficient of resistance. A typical suitable material of this type is a mixture of the oxides of manganese, nickel and cobalt. Alternatively, and preferably, region 4 may be an essentially intrinsic semiconductive material, having a thickness in the range of about $10^{-6}$ to $10^{-1}$ centimeters, selected from the group consisting of zinc telluride, cadmium telluride and zinc-cadmium telluride. Such a thermally sensitive resistance is disclosed and claimed in the copending application of Koller and Coghill, Serial No. 168,662, filed January 25, 1962, and assigned to the assignee of the present invention.

Electrodes 5 and 6, for example, may be thin transparent layers of a metal which make contact to the surfaces of the electroluminescent material and the thermally sensitive resistance material respectively. Alternatively, electrodes 5 and 6 may be layers of tin oxide or reduced titanium dioxide or other suitable transparent conducting layers. For many applications it will be apparent that the electrode in contact with the electroluminescent material should be transparent to visible radiation.

The devices of this invention may be constructed on a transparent electrically conducting substrate, such as an electrically conducting glass, or a nonconducting substrate, such as glass or the like having a transparent electrically conducting coating thereon, utilizing any of the well-known vacuum deposition techniques. Conveniently, such devices may be constructed utilizing the vapor reaction-deposition process substantially as disclosed in U.S. Patent No. 2,685,530, Cusano and Studer.

Thus, a typical device in accordance with this invention may comprise a glass substrate having a coating of titanium dioxide on one surface thereof. A layer of an electroluminescent material such as zinc sulfide activated with copper and coactivated with chlorine is deposited upon the electrically conducting tin oxide coating substantially as disclosed in the foregoing referenced patent. A layer of cadmium telluride having a thickness in the range of about $10^{-6}$ to $10^{-1}$ centimeters is similarly deposited upon the layer of electroluminescent material. A transparent electrically conducting layer is then deposited upon the cadmium telluride layer to complete the device. Preferably, this is a thin layer of a metal such as gold, copper or other metal with makes nonrectifying contacting wih cadmium telluride and may be conveniently of a grid-type structure; such structure being well-known in the art for making highly conductive transparent electrodes.

In operation as a radiation detecting device, a voltage is applied across the composite body 2. This may be provided by connecting electrodes 5 and 6 to a voltage source, which may be either alternating or direct current and which is shown schematically as a battery 7.

The incident radiation to be detected, indicated generally by the arrow A, passes through the transparent electrode 6 and is absorbed by the thermally sensitive resistance material of region 4. When the thermally sensitive resistance material has a negative temperature coefficient of resistance, heating due to such absorbed radiation causes a decrease in the resistance thereof. As a result of the decrease in resistance the field across the electroluminescent layer is increased producing a visible output therefrom may be observed through the glass substrate.

Although in the foregoing description the electroluminescent and thermally sensitive resistance regions 3 and 4 respectively have been referred to as "contacting" or in "contacting relationship" it will be understood that the device may also be constructed in a different configuration if desired. In this respect it is only necessary that the two regions be in an electrically conducting relationship. This is true of the device illustrated in FIGURE 1 as well as the devices illustrated in the other figures of the drawing.

In FIGURE 2 there is shown another embodiment of this invention. The structure shown in FIGURE 2 is similar to that shown in FIGURE 1 but includes an additional layer 10 of a material which is highly absorbing at the wavelength of the radiation to be detected. Layer 10 is in contact with transparent electrode 6 which in this embodiment is of metal or other material which is highly conducting both electrically and thermally.

In operation, the radiation to be detected is absorbed by the highly absorbing layer 10 and the heat produced thereby conducted through electrode 6 to thermally sensitive resistance region 4. The resulting increase in temperature causes a change in resistance in the thermally sensitive material of region 4. Again a decrease in resistance causes an increase in the electric field across the electroluminescent layer to produce the luminescent output. Preferably, the layer 10 of absorbing material should exhibit anisotropic thermally conducting characteristics. That is, layer 10 should provide for the conduction of heat readily to electrode 10 but not in the direction across the layer as, for example, from left to right in the figure. A typically sutiable absorbing material having such anisotropic thermally conducting characteristics is "gold black" which is the term commonly used for oxidized gold layers. Alternatively, the layer 10 may be any thin film of highly absorbing material; the thinness of the film inherently providing the desired anisotropic thermally conducting characteristics.

There are many applications wherein it is desirable to provide a device which will indicate information in "bit" form. This may be provided in accordance with the embodiment of the invention illustrated in FIGURE 3. As shown, the device comprises a composite structure including a region of 3 of electroluminescent material, a region 4 of a thermally sensitive resistance material and an intermediate region 12 of an electrically conducting material. Region 12 provides good electrical conduction between the regions 3 and 4 but not laterally across the device. For example, region 12 may be in the form of a plurality of parallel metal strips 13 which will provide the required good electrical conduction through the device between regions 3 and 4 but none or only very poor electrical conduction in the direction across the device from left to right in the drawing. Any other discontinuous structure of electrically conducting material which will provide this result is satisfactory. Alternatively, the region 12 may be a very thin deposited continuous layer or such a thin layer in a grid-type structure; such layers also providing anisotropic electrical conducting characteristics.

In operation, the radiation to be detected incident on a particular portion of the device is absorbed by the thermally sensitive resistance material at that portion of region 4 causing a change in resistance thereof and a change in the luminescent output of that portion. For example, a decrease in resistance due to such absorbed radiation produces an increase in the luminescent output of that portion. At the same time the portions of the device not subjected to incident radiation remain unchanged due to the anistotropic electrically conducting characteristics of region 12.

Since the devices of this invention may be similarly excited to luminescence by incident cathode rays, the invention may be utilized to provide long persistence luminescent screens. In such operation, incident cathode rays, modulated in any conventional manner, produce a high current density locally, decreasing the resistance of that local portion of the thermally sensitive resistance material and increasing the field across the electro-luminescent material to produce a luminescent output therefrom. The rate of decay of the luminescent output is dependent upon the rate at which the absorbed energy is dissipated.

There has been described hereinbefore, therefore, new and improved electroluminescent devices having unique construction and which are particularly suitable for use as broad band visible display radiation detecting devices and long persistence luminescent screens, as well as a wide range of other applications.

While this invention has been described with respect to specific embodiments, many changes and modifications will occur to those skilled in the art. It is, therefore, to be understood that the appended claims are intended to cover all such changes and modifications as come within the true spirit and scope of this invention.

What I claim as new and desire to secure by Letters Patent of the United States is:

1. An electroluminescent device comprising: a composite structure including in electrically conducting contiguous relationship, a region of an electroluminescent material and a region of a thermally sensitive resistance material sandwiched between a pair of transparent electrodes, said thermally sensitive resistance material comprising a crystalline film of essentially intrinsic semiconductive material selected from the group consisting of zinc telluride, cadmium telluride, and zinc-cadmium telluride.

2. An electroluminescent device comprising: a region of an electroluminescent material and a region of a thermally sensitive resistance material disposed in electrically conducting relationship; said thermally sensitive resistance material comprising a crystalline film of essentially intrinsic semiconductive material selected from the group consisting of zinc telluride, cadmium telluride and zinc-cadmium telluride; first and second trransparent electrically conducting layers in contact with the surface of said electroluminescent and thermally sensitive resistance regions respectively; said electroluminescent region and said thermally sensitive region being connected in series between said electrodes; and means for applying a potential across said electrically conducting layers so that a change in resistance in said thermally sensitive resistance material produces a change in the electric field across said electroluminescent region.

3. A radiation detecting device comprising: a first region composed of an electroluminescent material; a second region composed of a thermally sensitive resistance material comprising a crystalline layer of essentially intrinsic semiconductive material selected from the group consisting of zinc telluride, cadmium telluride and zinc-cadmium telluride, a third region composed of a material which absorbs highly at the wavelength of the radiation to be detected, at least said first and second regions being disposed in electrically conducting relationship and said third region disposed in thermal conducting relationship with at least said second region so that heat produced in said third region is conducted to said second region and causes a change in resistance thereof; first and second transparent electrodes in contact with said first and second regions respectively; said electroluminescent region and said thermally sensitive region being connected in series between said electrodes; and means for applying a potential across said first and second regions so that a change in resistance in said second region results in a change in the electric field across said first region.

4. The radiation detecting device of claim 3 wherein said third region is disposed in electrical and thermal contact intermediate said first and second regions.

5. The radiation detecting device of claim 3 wherein said third region is disposed in a surface-adjacent portion of said second region.

6. A radiation detecting device comprising: a substrate having a transparent electrically conducting surface layer thereon; an electroluminescent layer in contact with the electrically conducting surface layer of said substrate; a thermally sensitive resistance layer in contact with said electroluminescent layer, said layer comprising a crystalline film of essentially intrinsic semiconductive material selected from the group consisting of zinc telluride, cadmium telluride and zinc-cadmium telluride having a thickness in the range of about $10^{-6}$ to $10^{-1}$ centimeters; and a second electrically conducting layer transparent to at least the radiation to be detected in contact with said thermally sensitive resistance layer and making nonrectifying contact therewith; said electroluminescent layer contacting only one of said first and second electrically conducting layers and said thermally sensitive layer contacting only the other of said first and second electrically conducting layers; and means for applying a voltage to said electrically conducting layers and across said electroluminescent and thermally sensitive resistance layers.

7. An electroluminescent device comprising a pair of transparent electrodes, and first and second regions disposed in electrically conducting relationship, said regions being connected in series between said electrodes; said first region being composed of an electroluminescent material and said second region being composed of a thermally sensitive resistance material comprising a crystalline layer of essentially intrinsic semiconductive material selected from the group consisting of zinc telluride, cadmium telluride and zinc-cadmium telluride.

References Cited by the Examiner

UNITED STATES PATENTS

| | | | |
|---|---|---|---|
| 2,989,636 | 6/61 | Lieb | 250—213 X |
| 2,994,621 | 8/61 | Hugle et al. | 117—227 X |
| 3,034,011 | 5/62 | Nisbet et al. | 313—108.1 |
| 3,101,408 | 8/63 | Taylor | 250—213 X |

GEORGE N. WESTBY, *Primary Examiner.*